US012551063B2

(12) United States Patent
Beckhart

(10) Patent No.: US 12,551,063 B2
(45) Date of Patent: Feb. 17, 2026

(54) HANDLE FOR BARBECUE TOOLS AND FOR OTHER IMPLEMENTS

(71) Applicant: Gordon Haggott Beckhart, Colorado Spring, CO (US)

(72) Inventor: Gordon Haggott Beckhart, Colorado Spring, CO (US)

( * ) Notice: Subject to any disclaimer, the term of this patent is extended or adjusted under 35 U.S.C. 154(b) by 291 days.

(21) Appl. No.: 17/803,716

(22) Filed: Oct. 28, 2022

(65) Prior Publication Data

US 2023/0136968 A1     May 4, 2023

Related U.S. Application Data

(60) Provisional application No. 63/274,902, filed on Nov. 2, 2021.

(51) Int. Cl.
*A47J 43/28*     (2006.01)

(52) U.S. Cl.
CPC .................... *A47J 43/288* (2013.01)

(58) Field of Classification Search
CPC ........ A47J 43/288; A47J 43/28; A47J 43/281; A47J 43/282; A47G 21/02; A47G 21/002; A47G 21/04; A47G 21/045; A61J 7/0023; B25G 1/08; B25G 1/10; B25G 1/102
USPC .............. 30/345, 322–328; 16/436, 421, 435
See application file for complete search history.

(56) References Cited

U.S. PATENT DOCUMENTS

| 2,558,399 | A | * | 6/1951 | Unsinger | B26B 1/08 |
| | | | | | 7/118 |
| 11,364,644 | B2 | * | 6/2022 | Rus | B26B 29/02 |
| 2018/0263455 | A1 | * | 9/2018 | Weinberger | B25G 3/14 |

FOREIGN PATENT DOCUMENTS

KR     20210096772     *   8/2021

OTHER PUBLICATIONS

KR20210096772 (MT) (Year: 2021).*

* cited by examiner

*Primary Examiner* — Boyer D Ashley
*Assistant Examiner* — Fred C Hammers
(74) *Attorney, Agent, or Firm* — The Law Office of Patrick F. O'Reilly III, LLC

(57) ABSTRACT

A barbecue spatula is taught having a handle that can attach to any ferromagnetic surface, and specifically to a side table of a grill. The handle of the spatula has a front side and a rear side, and the front side has a lower front side and an upper front side. The upper front side is attached to the rear side by a hinge element positioned at the distal end of the handle, allowing for the upper front side to swing out from the rear side. Magnets on the inside of the upper front side allow the attachment of the handle and the entire barbecue spatula to a side table of a grill. Ferromagnetic structures on the inside surface of the rear side keep the upper front side from swinging freely. This handle can be used for other barbecue tools, including barbecue forks, barbecue brushes, etc. The handle can also be used for other tools.

19 Claims, 16 Drawing Sheets

HANDLE FOR BARBECUE TOOLS AND FOR OTHER IMPLEMENTS

This application claims priority to US Provisional Application No. 63/274,902, filed Nov. 2, 2021, herein incorporated by reference in its entirety.

FIELD OF THE DISCLOSURE

A handle and an implement including the same is disclosed which has the ability to attach to certain metallic tops or sides.

BRIEF DESCRIPTION OF THE FIGURES

The features and advantages of the present disclosure will be more apparent from the following detailed description in conjunction with the accompanying drawings, in which.

DETAILED DESCRIPTION OF THE DISCLOSURE

Figure 1:
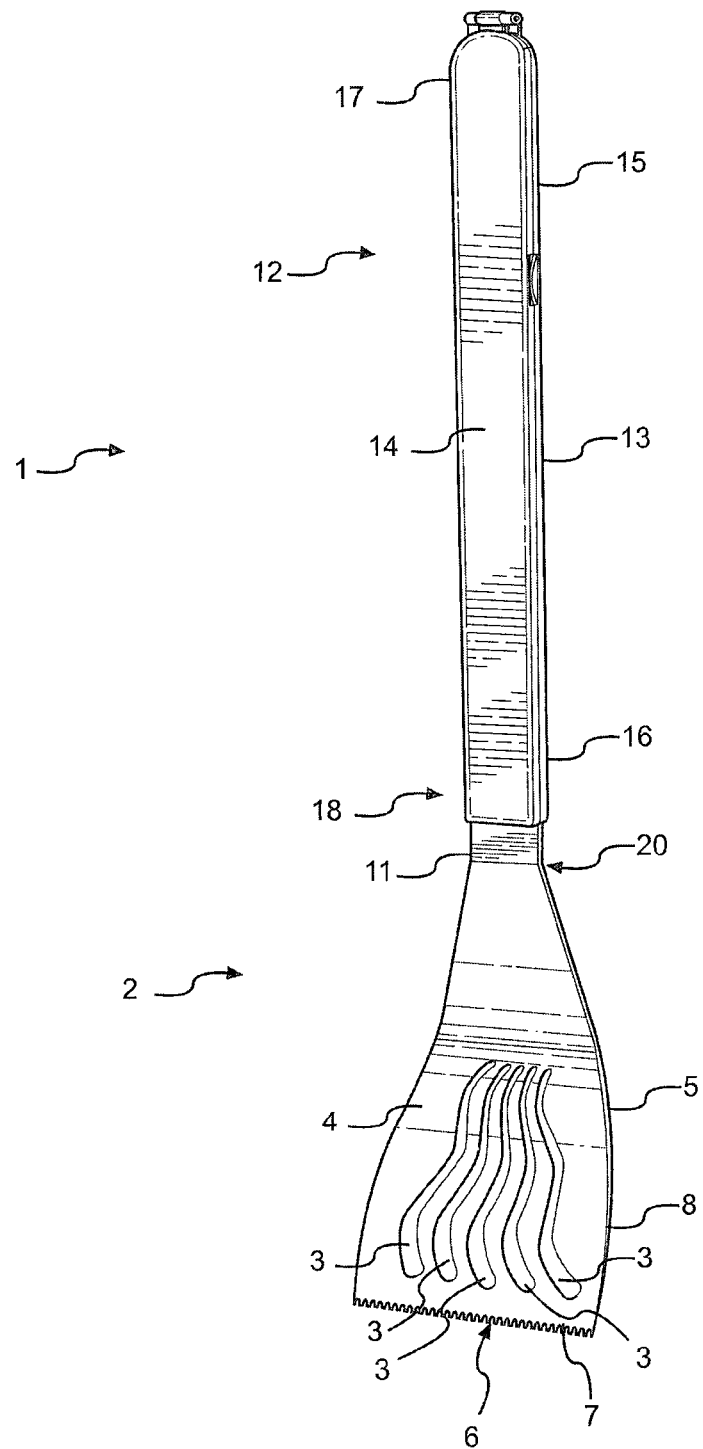
FIG. 1 is a perspective view of the spatula.
Figure 2:
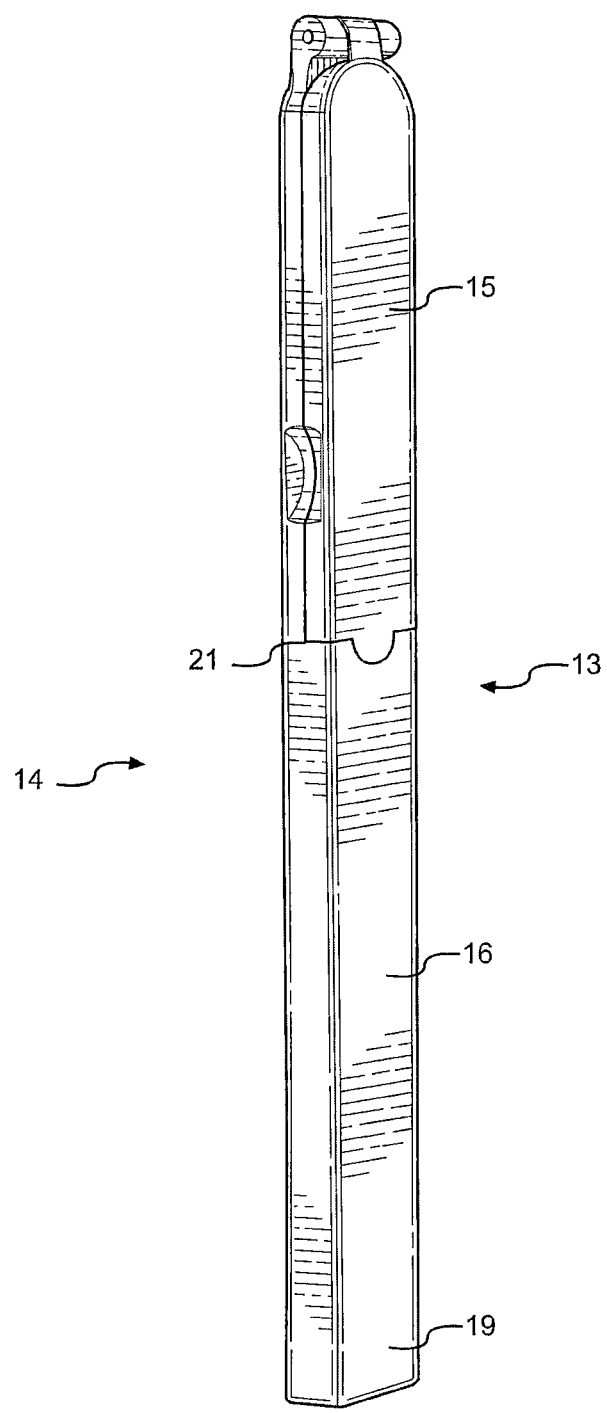
FIG. 2 is a perspective view of the spatula handle.
Figure 3:
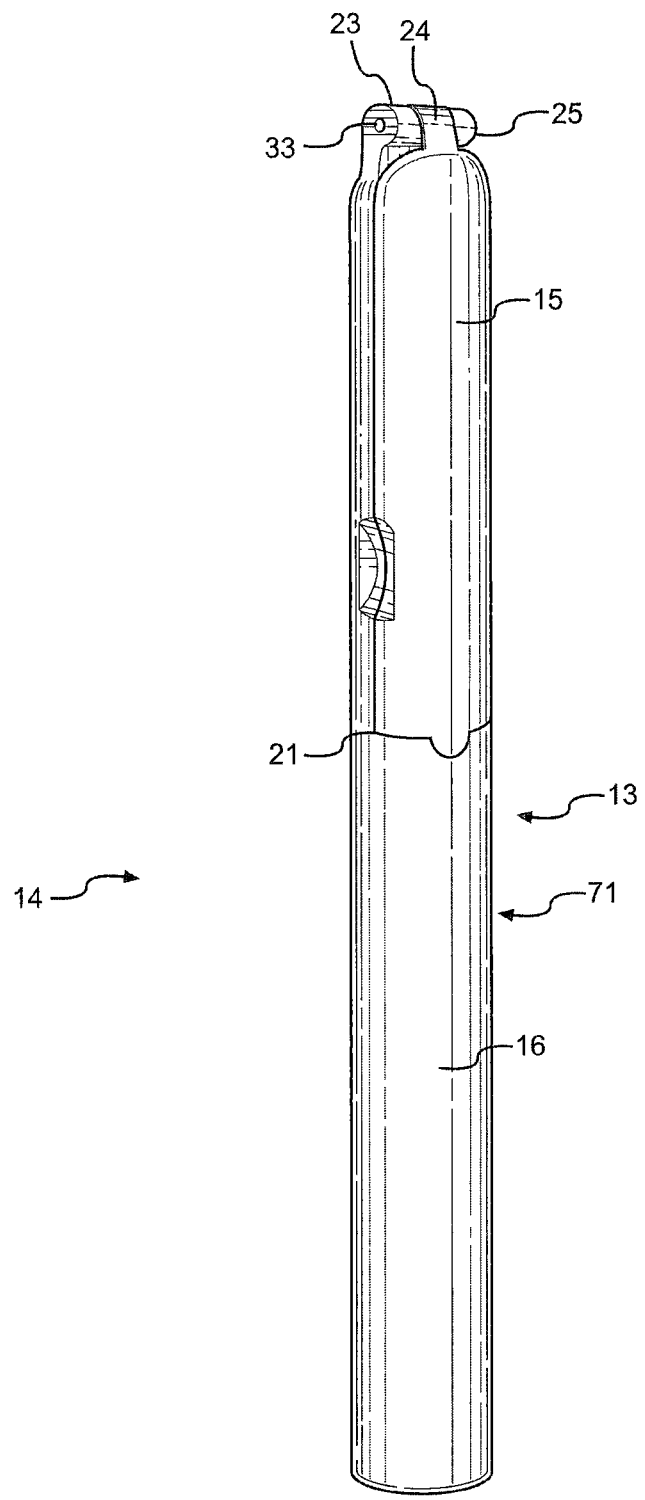
FIG. 3 is a perspective view of the rounded spatula handle.
Figure 4:
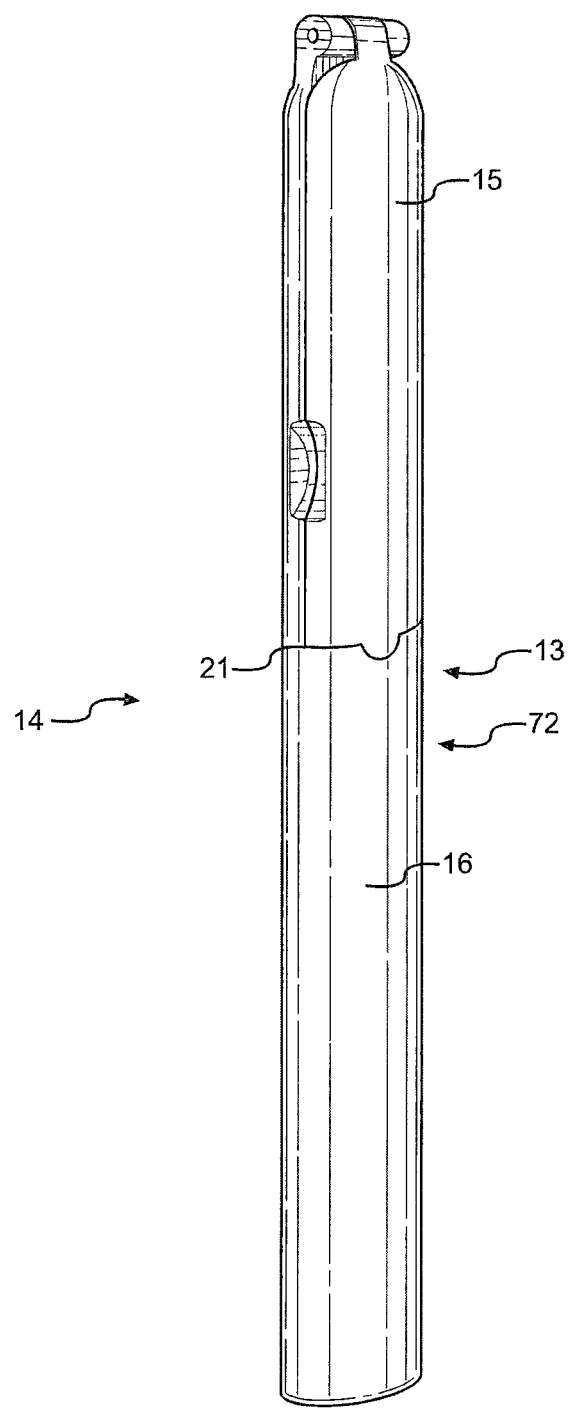
FIG. 4 is a perspective view of the oval spatula handle.
Figure 5:
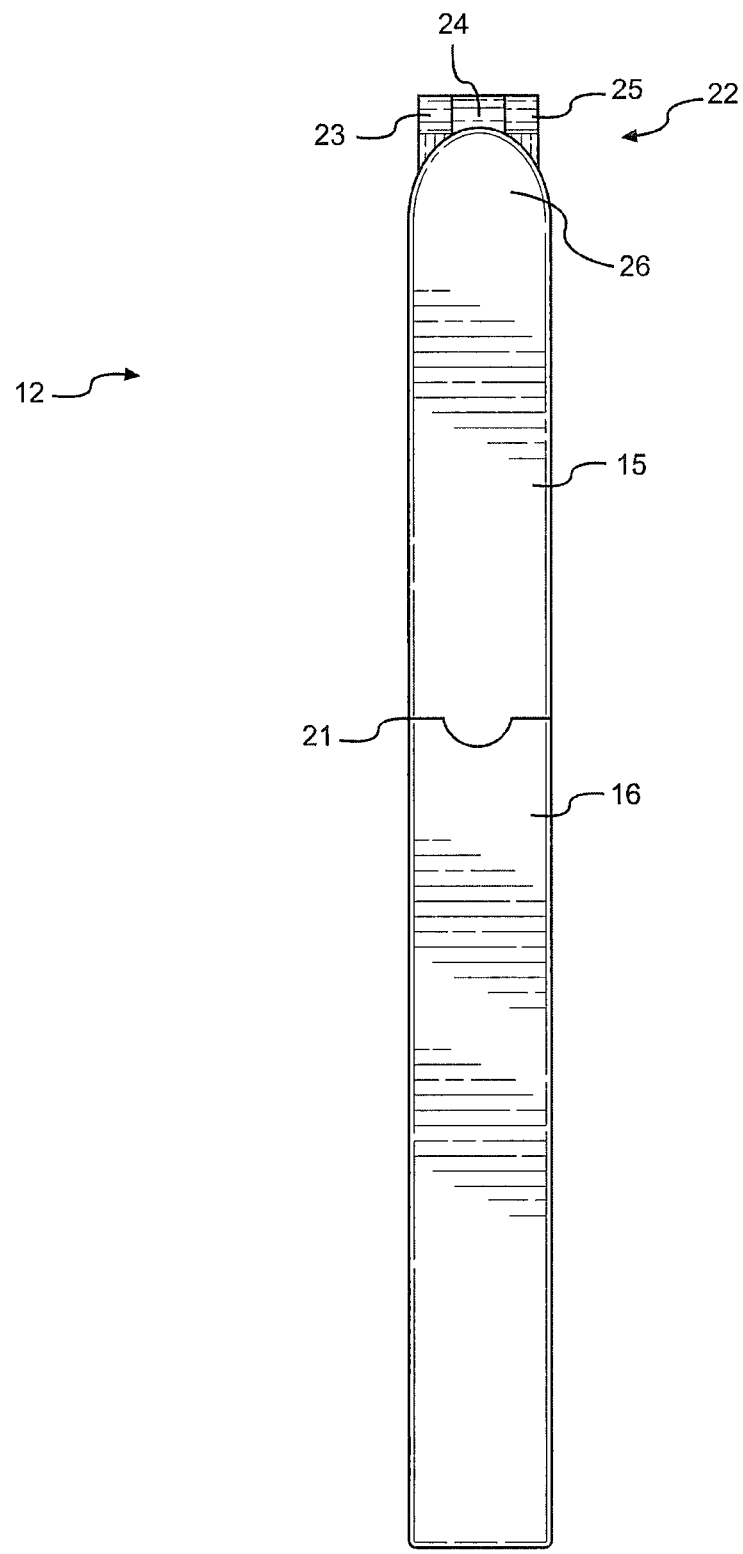
FIG. 5 is an overhead view of the front side of the spatula handle.
Figure 6:
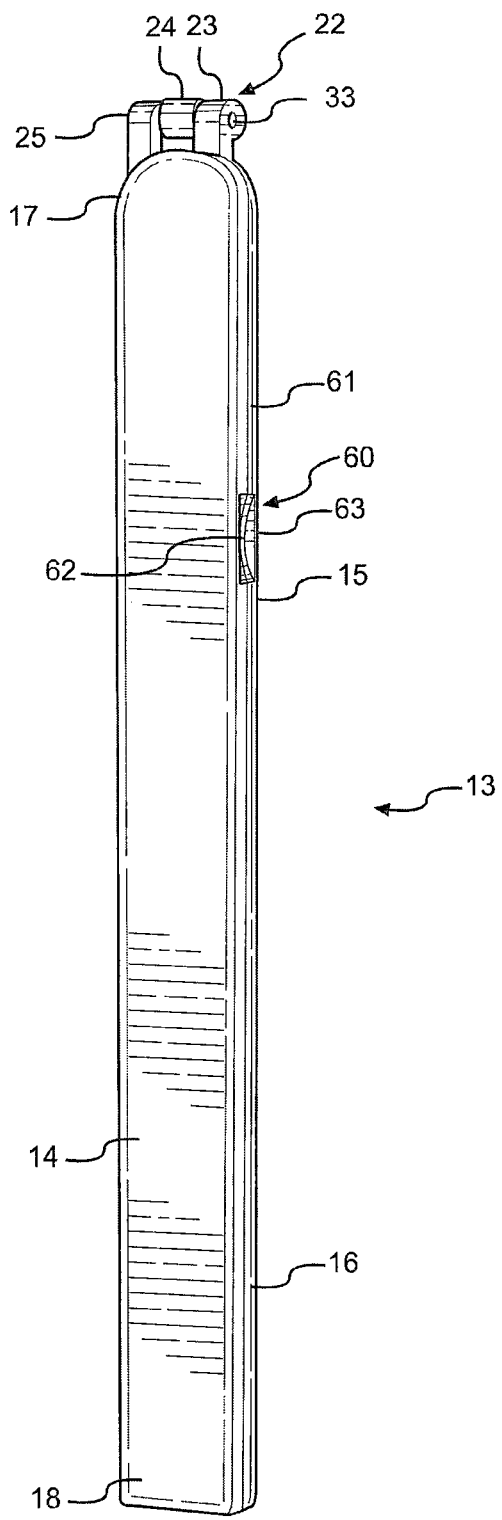
FIG. 6 is a perspective view of the back side of the spatula handle.
Figure 7:
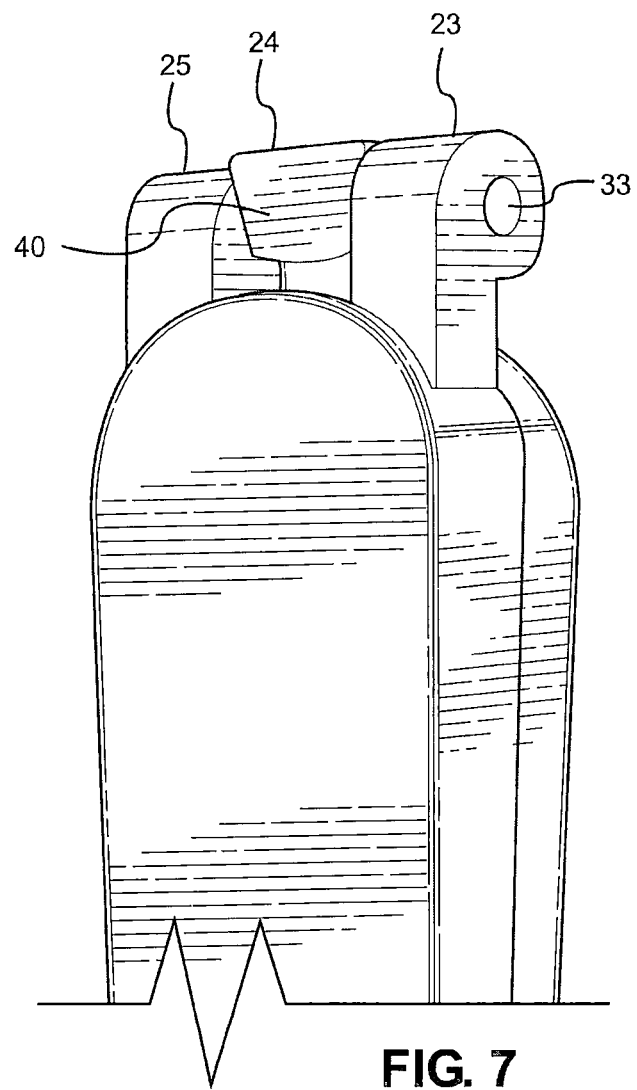
FIG. 7 is a close-up perspective view of the hinge.
Figure 8:
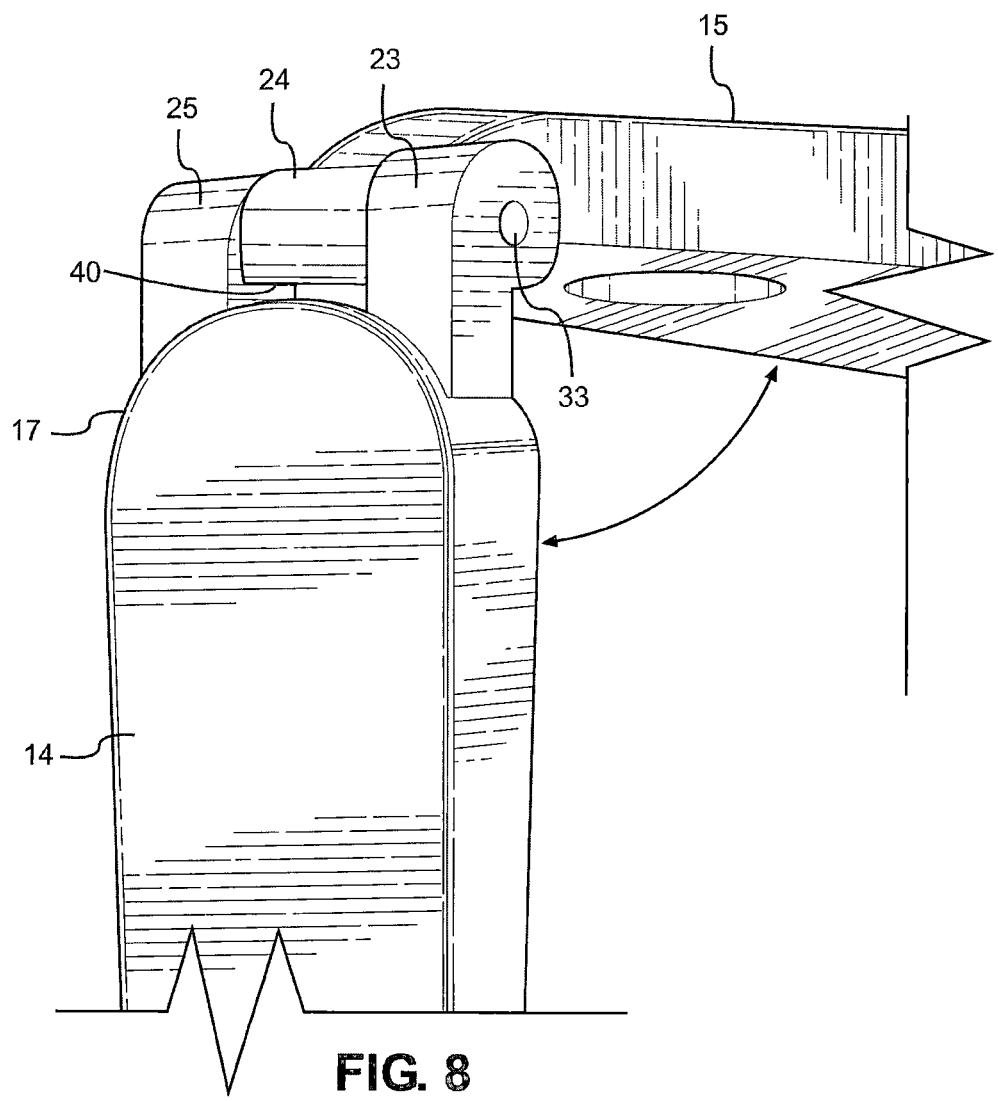
FIG. 8 is a close-up perspective view of the hinge when the handle is in the open position.
Figure 9:
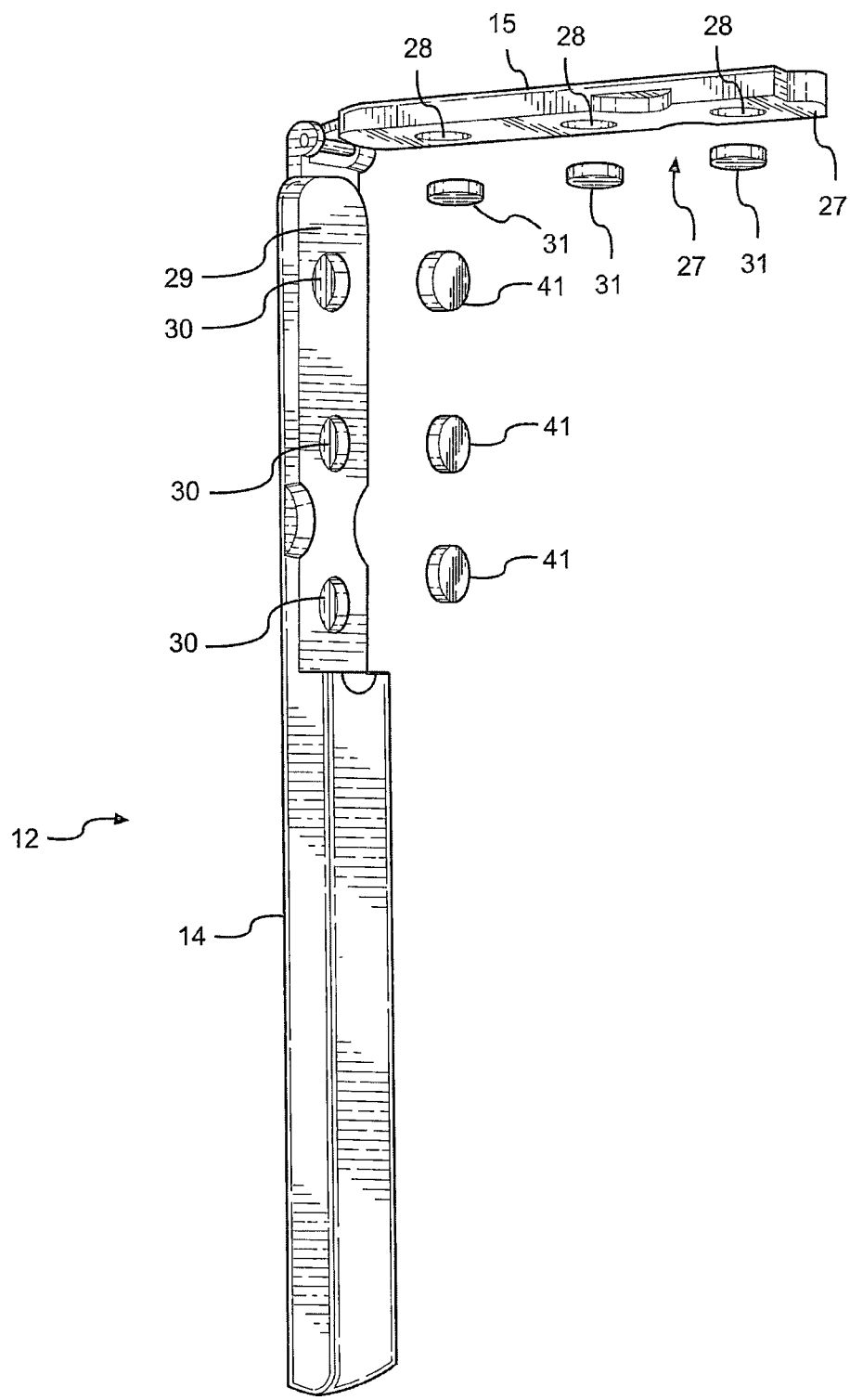
FIG. 9 is a perspective open view of the front side of the spatula handle.
Figure 10:
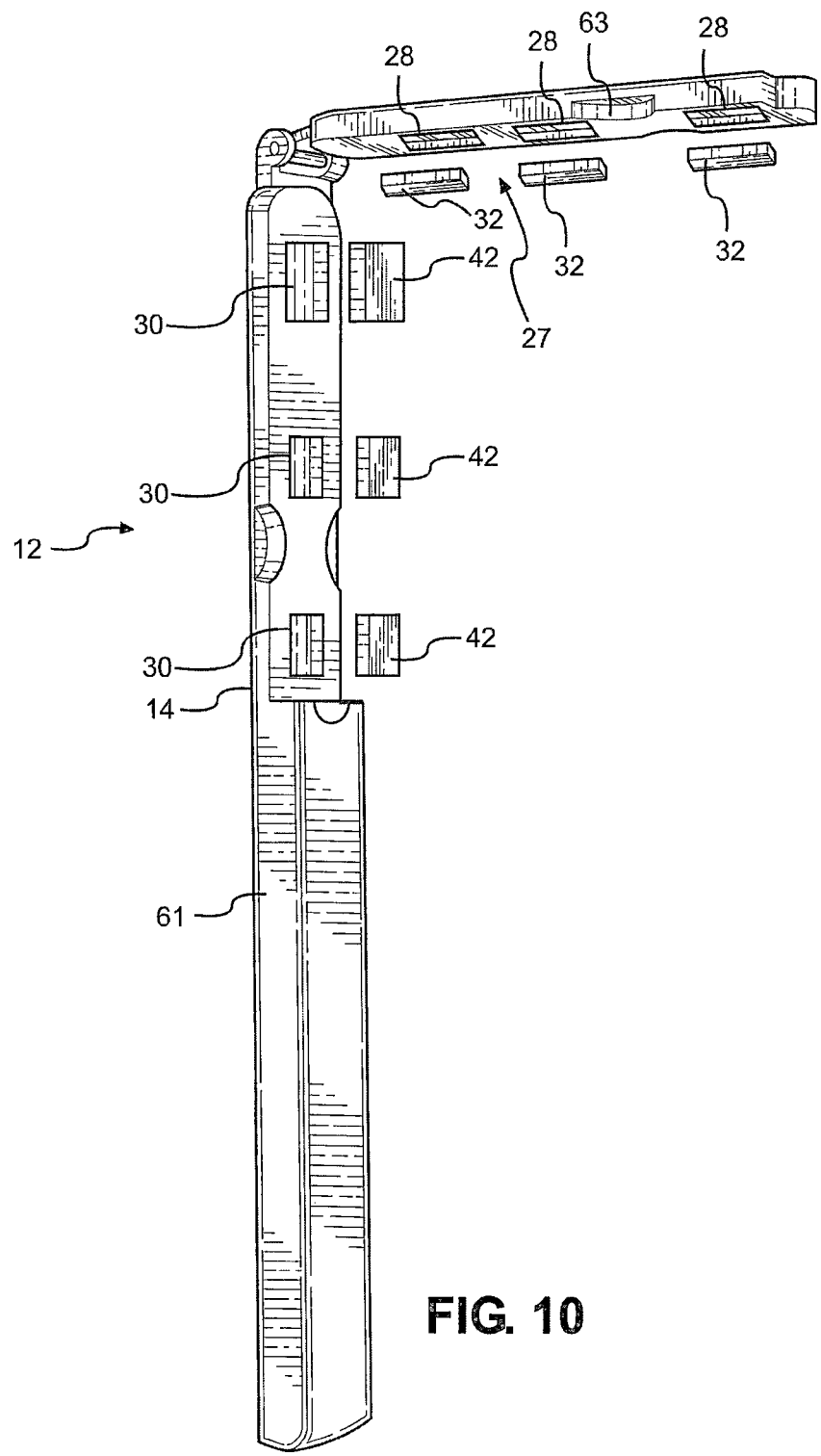
FIG. 10 is a perspective open view of another embodiment of the spatula handle.
Figure 11:
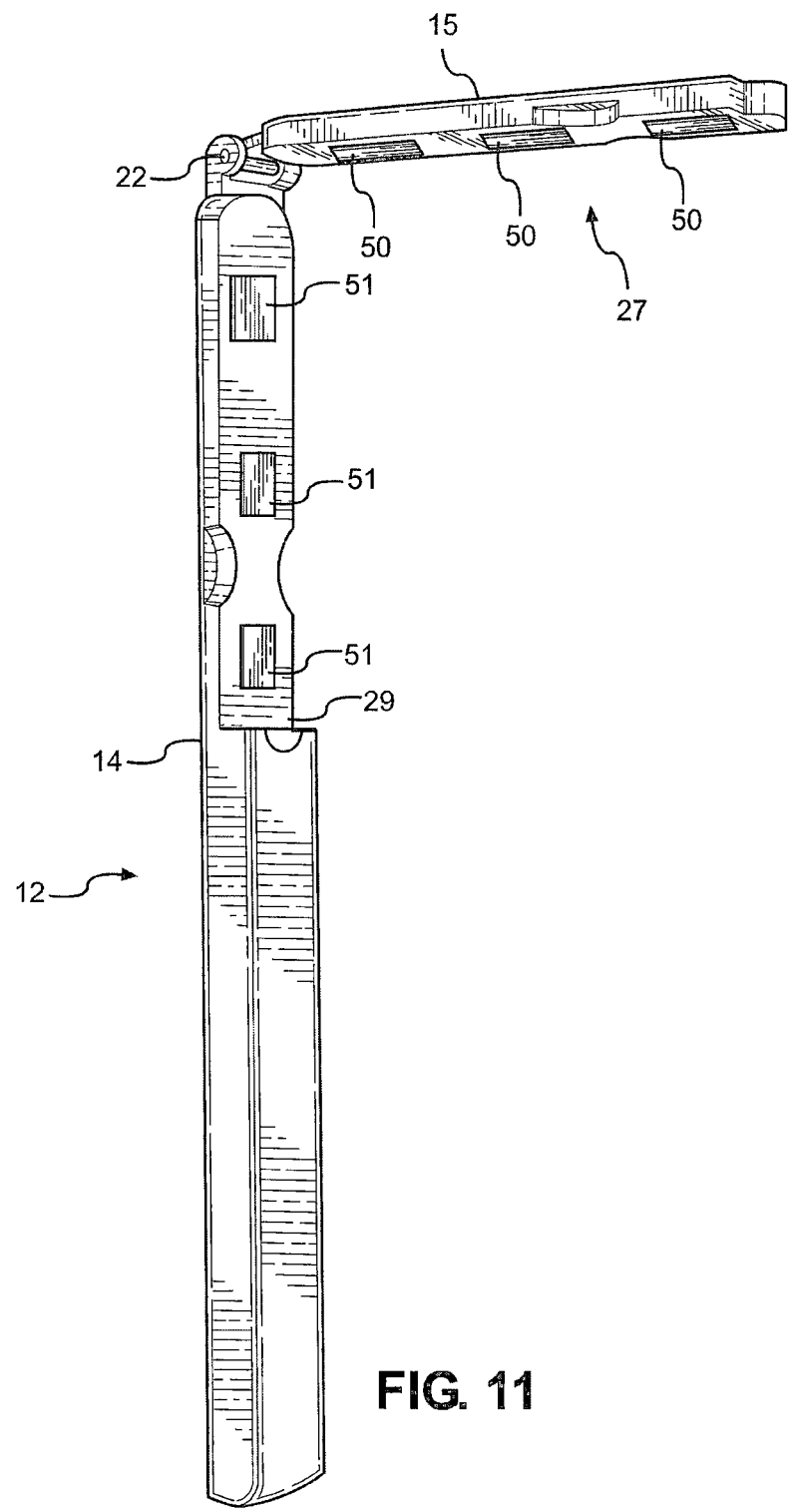
FIG. 11 is a perspective open view of yet another embodiment of the spatula handle.

This disclosure is for a handle that allows for the easy hanging or management of barbecue tools while cooking. The handle has applications to barbecue spatulas, other barbecue tools, and even craftsman tools.

To illustrate the practical functional capabilities of this disclosure, a barbecue spatula 1 is shown, having a blade 2, also known as the tool part of the spatula 1. The blade 2 is made of metal, although in alternative embodiments, the blade is made of plastic, silicon, or wood. In one embodiment, and for example only, the blade 2 has precut holes 3 through its surface 4, and through the underside 5 of the blade 2. In another embodiment, there is a serrated edge 6 at the front 7 or side 8 of the blade 2. Other embodiments of the blade 2 have more, fewer or no holes or blades. For the purposes of this disclosure, all complete barbecue devices such as the barbecue brush, a barbecue spatula, a barbecue fork, etc., including the handles and tools, are referred to as barbecue implements.

In one embodiment of the disclosure, a shaft 11 at the distal end 20 of blade 2 is held in place between a front side 13 and rear side 14 of a handle 12. The front side 13 of the handle 12 has an upper front side section 15 and a lower front side section 16. The rear side 14 of the handle has a distal end 17 and a proximal end 18. In other embodiments, the shaft 11 connects to other tools, such as brushes, forks, etc. and even other non-barbecue tools, including screwdrivers, etc.

In one embodiment, the shaft 11 extends along the entire length of the lower front side section 16. There are many ways to secure the extension 11 in the handle 12, including glue, rivets, mere force, and any other way known in the art. In another embodiment, the shaft 11 extends only part of the length of the lower front side section 16. In another embodiment, the shaft 11 is attached to the proximal end 18 of the rear side 14 or the proximal end 19 of the lower front side section 16 by rivets, adhesive or any other means known in the art. In another alternative embodiment, the shaft 11 is attached to the distal end 17 of the rear side 14. There are many methods of attachment known in the art.

It should be noted that in one embodiment, the handle 12 is made of wood, and in another embodiment, the wood is fire resistant or coated/saturated with a fire resistant substance. In yet another embodiment, the handle 12 is made out of plastic, some other resin substance, metal, or ceramics. Other materials may be used as well and there may be a combination of materials used.

The front side section 13 and the rear side section 14 of the handle 12 are flat and rectangular shaped. In another embodiment, the handle sections 13, 14 are rounded 71. In another embodiment, the handle sections are oval 72. In another embodiment, only the front side 13 is rounded or oval. Any geometric shape of the handle 12 is acceptable.

As shown in the figures the lengths of the upper front side section 15 and the lower front side section 16 are complementary and together form the length of the handle 12. The boundary 21 can be positioned almost anywhere along the length of the front side 13 of the handle 12, as long as the positioning is practical, as will be explained, infra. Of course, the longer in length the upper front side section 15, the shorter in length the lower front side section 16 is, and vice versa.

The distal end 26 of the upper front side section 15 is attached by a hinge 22 to the distal end 17 of the rear side 14 of the handle 12. Almost any kind of hinge can be used to allow for the upper front side section 15 to swing out from the rest of the handle 12. In one embodiment knuckles 23, 24, 25 of the hinge are extensions of both the distal end 17 of the rear side 14 of the handle 12 and the distal end 26 of the upper front side section 15 of the handle 12. A pin 33 is secured through the center of the knuckles 23, 24, 25. In another embodiment, in a hinge with leaves, the hinge leaves are glued, screwed, or nailed to a distal end 26 of the upper front side section 15 and to the distal end 17 of the rear side 14 of the handle 12.

In one embodiment, the knuckle 24, also referred to as the central knuckle, has a flat surface 40, also referred to as a stop surface 40, which prevents the front side 13 of the handle 12 from being opened any greater than about 90 degrees in relation to the rear side 14 of the handle 12. In yet another embodiment, there is no stop surface 40 and the front side 13 and rear side 14 of the handle 12 can open as wide as the hinge 22 allows.

In yet another embodiment, there is, in place of a traditional hinge 22, a strip of cloth, flexible plastic or steel belted material. For the purposes of easy identification, all of these items, including the term "hinge" will fall under the term "flexing connector."

In one embodiment, on the inside surface 27 of the upper front side section 15 are three depressions or cutouts 28. In another embodiment, there are more than three depressions or cutouts. In another embodiment, there are one or two cutouts 28. In one embodiment, as shown, the cutouts 28 are round. In another embodiment, the cutouts 28 are square. In yet another embodiment, the cutouts 28 are rectangular or any other geometric shake, and in yet another embodiment, the cutouts are oval. In yet another embodiment, the cutouts 28 are amorphous.

In another embodiment, on the inside surface 29 of the rear side 14 handle 12 are cutouts 30 that correspond to the cutouts 28 on the inside surface 27 of the upper front side section 15 of handle 12. In one embodiment, the cutouts 30 are of different shapes than the cutouts 28 on the inside surface 27 of the upper front side section 15 but are generally still positioned opposite the cutouts 28.

In one embodiment, magnetic inserts 31 are positioned on the inside of the plurality of the cutouts 28 of the inside surface 27 of the upper front side section 15 of handle 12. In one embodiment, the magnetic inserts 31 have the same approximate or "identical" shape and the same approximate or "identical" diameter and height as the geometric shape of the cutouts 28. In one embodiment, the magnetic inserts 31 are wedged into the cutouts 28 such that there is a tight fit, and the magnetic inserts 31 are held in place by force. In another embodiment, the magnetic inserts 31 are held in place by glue. In another embodiment, the magnetic inserts 31 are secured by pins. Any method known in the art can be used. Furthermore, there may be differences in the shape and diameter and height from each other.

In yet another embodiment, magnetic inserts 31 fit within the plurality of the cutouts 28 of the inside surface 27 of the upper front side but do not have same geometric shape as the cutouts 28.

Opposite the magnetic inserts 31 are ferromagnetic inserts, 41, inserts to which magnets are attracted, positioned within at least one of the cutouts 30 of the inside surface 29 of the rear side 14 of the handle 12. As with the magnetic inserts 31, the ferromagnetic inserts 41 can be varied in shape, either matching the shape of the cutouts 30 inside surface of the rear side 14 of the handle 12, or having a different shape. For instance, and as above, if the cutout 30 is round, the ferromagnetic insert 41 is round, and can be secured into the round cutout 30. In an alternative embodiment, the ferromagnetic insert 42 is a different shape than the round cutout. Again, the cutout 30 can be any shape, as can the ferromagnetic insert 41, as long as the ferromagnetic insert 41 has the ability to fit within the cutout. Any method can be used to secure the ferromagnetic insert 41 into the cutout 30. Similarly, the cutout 28, as well as the magnetic inserts 31 can be any shape as long and the magnetic inserts 31 can fit within the cutout 28.

In one embodiment, the cutouts and the magnetic inserts 31 and the ferromagnetic inserts 41 are approximately equal in height. In another embodiment, the height of the magnets 31 and ferromagnetic structures 41 are approximately equivalent to the height of the respective cutouts 28, 30. In another embodiment, the magnetic inserts 31 are taller than the cutouts 28, and the ferromagnetic inserts 41 are shorter than the cutouts 30 by the same height as the differences between the magnetic inserts 31 and the cutouts 28. In yet another embodiment, the ferromagnetic inserts 41 are taller than the height of the cutouts 30 and the magnetic inserts 31 are shorter than the cutouts 28 by the same height differential between the ferromagnetic inserts 41 and the cutouts 30.

In yet another embodiment, cutouts 28 have different shapes in the same inside surface 27 of the same upper front side section 15. In other words, the cutouts 28 in the same inside surface 27 of the same upper front side sections 15 can vary in shape and size from each other. This applies to the cutouts 30 on the upper inside surface 29 of the rear side 14 of the handle 12.

In another embodiment, there are no cutouts. The magnet(s) is (are) a flat magnetic plate 50, positioned on the inside surface 27 of the upper front side section 15 of the handle 12. There can be one long flat plate, one plate located near the distal end of the handle 12, or any other arrangement. Opposite the flat magnetic plate 50 is a flat ferromagnetic plate 51 positioned on the inside surface 29 of the rear side 14 of the handle 12. The flat magnetic plate 50 and the flat ferromagnetic plate 51 can sit respectively on top of the inside surface 27 of the upper front side section 15 on the inside surface 29 of the rear side 14 of the handle 12. There can be one magnetic plate 50 opposite a ferromagnetic plate 51 or insert 41, or there can be a multiple of ferromagnetic plates 51 opposite an equal number of magnetic plates 50. The magnetic plate(s) 50 and the ferromagnetic plate(s) 51 can be attached to their respective surfaces or sections by any means known in the art, and as stated above for the other magnetic and ferromagnetic structures.

In one embodiment, the magnetic plate 50 or magnetic insert 31 are positioned near the distal end of the handle 12 when there is only one magnetic structure being used.

In another embodiment, the handle 12 has an edge thumb indent 60 to allow for the easy opening of the handle 12. More specifically, on at least one of the sides 61 of the handle is an indent 62 on the edge of the rear side of the handle 14 and directly opposite it on the upper front side section is an indent 63 on the edge of the upper front side section 15 of the handle 12. The edge thumb indent 60 can also be used as a thumb rest when a person is holding onto the handle 12. In one embodiment, the edge thumb indent 60 is on one edge of the handle 12.

In another embodiment, the edge thumb indent 60 is on the other, edge of the handle 12. In yet another embodiment, the edge thumb indent is on both edges of the handle 12.

Figure 12:
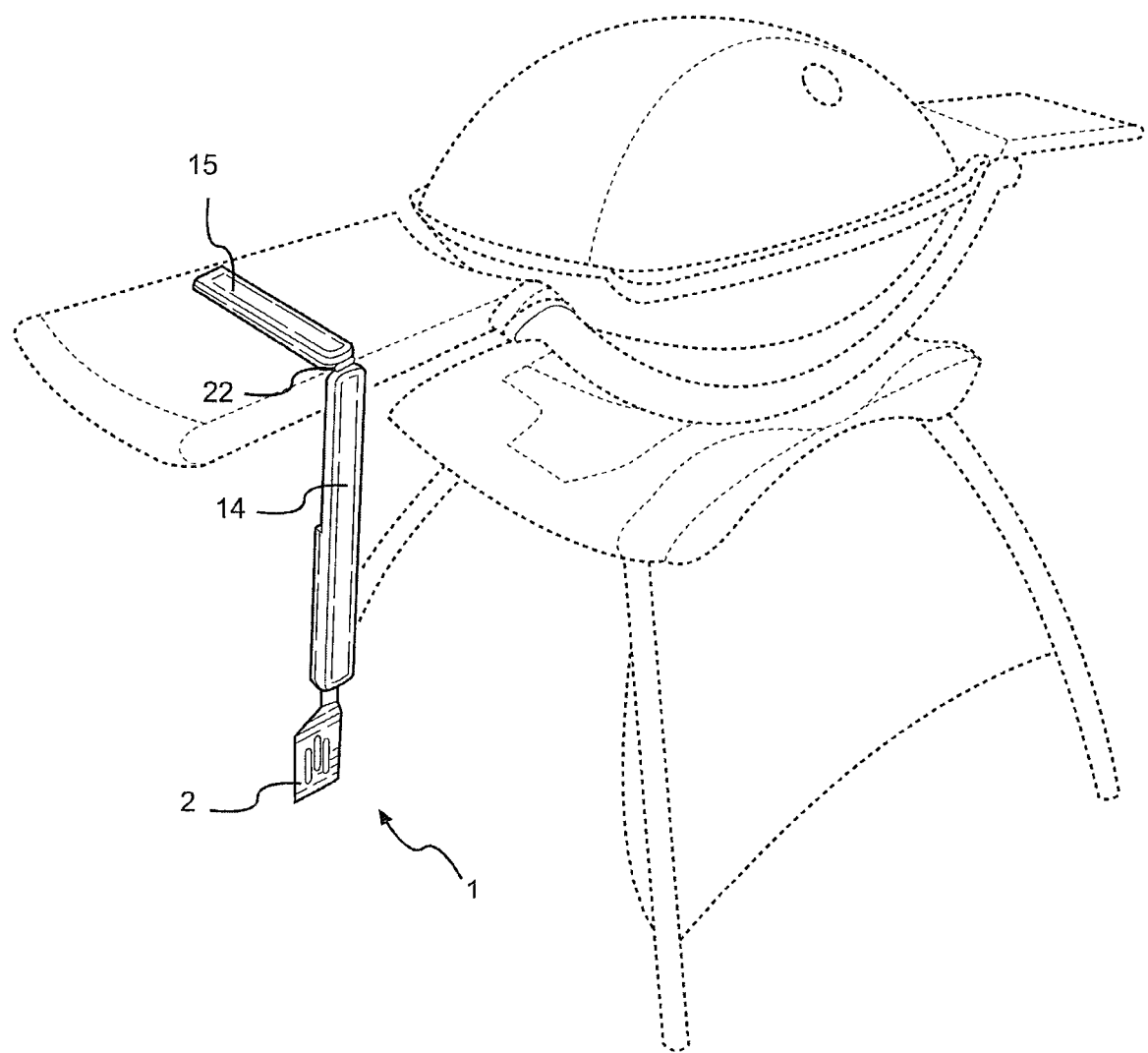
FIG. 12 is a perspective view of the spatula in use.
Figure 13:
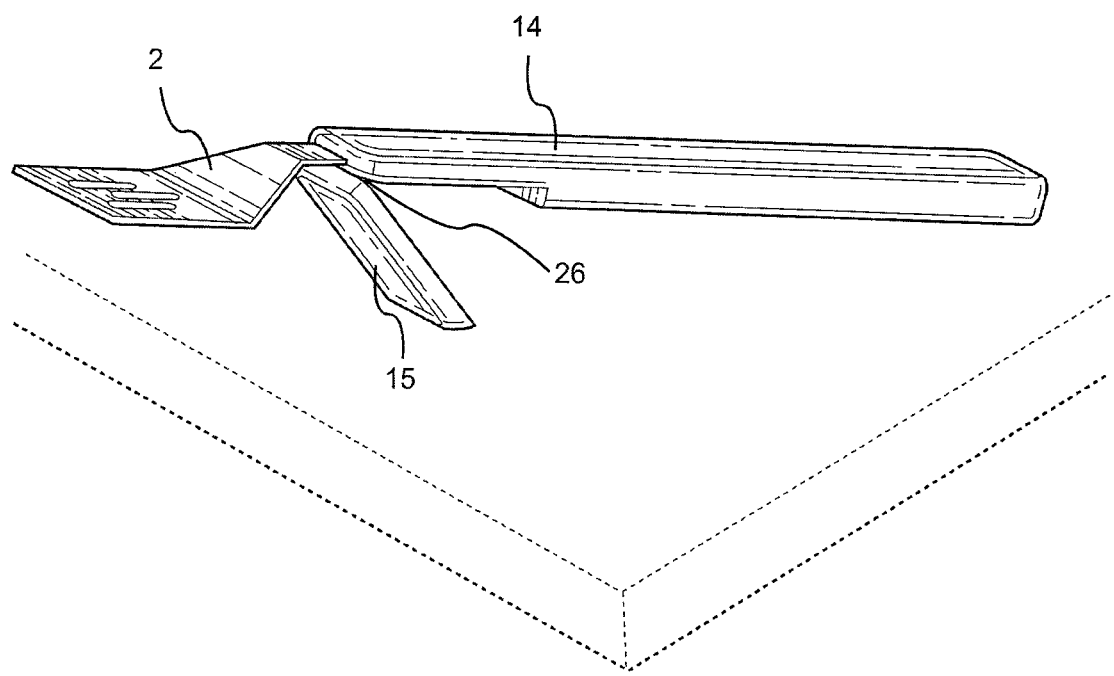
FIG. 13 is a perspective view of another embodiment of the spatula tool positioned at the distal end of the handle.
Figure 14:
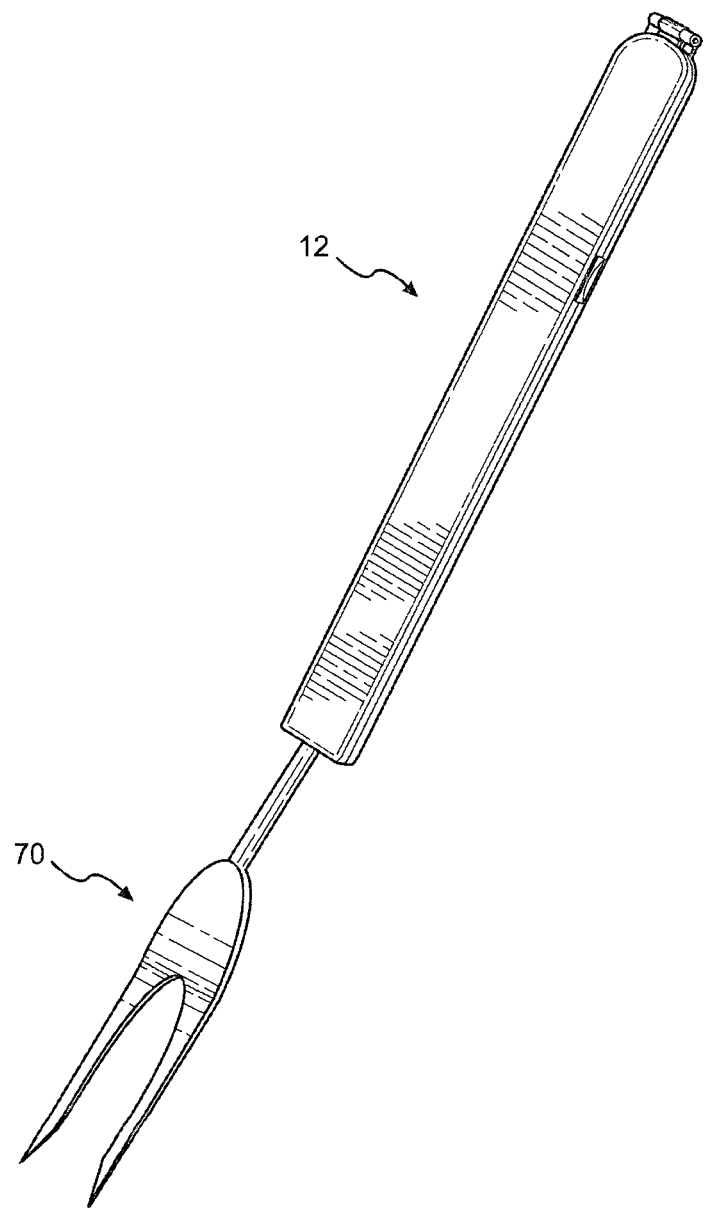
FIG. 14 is a perspective view of a barbecue fork with the handle.
Figure 15:
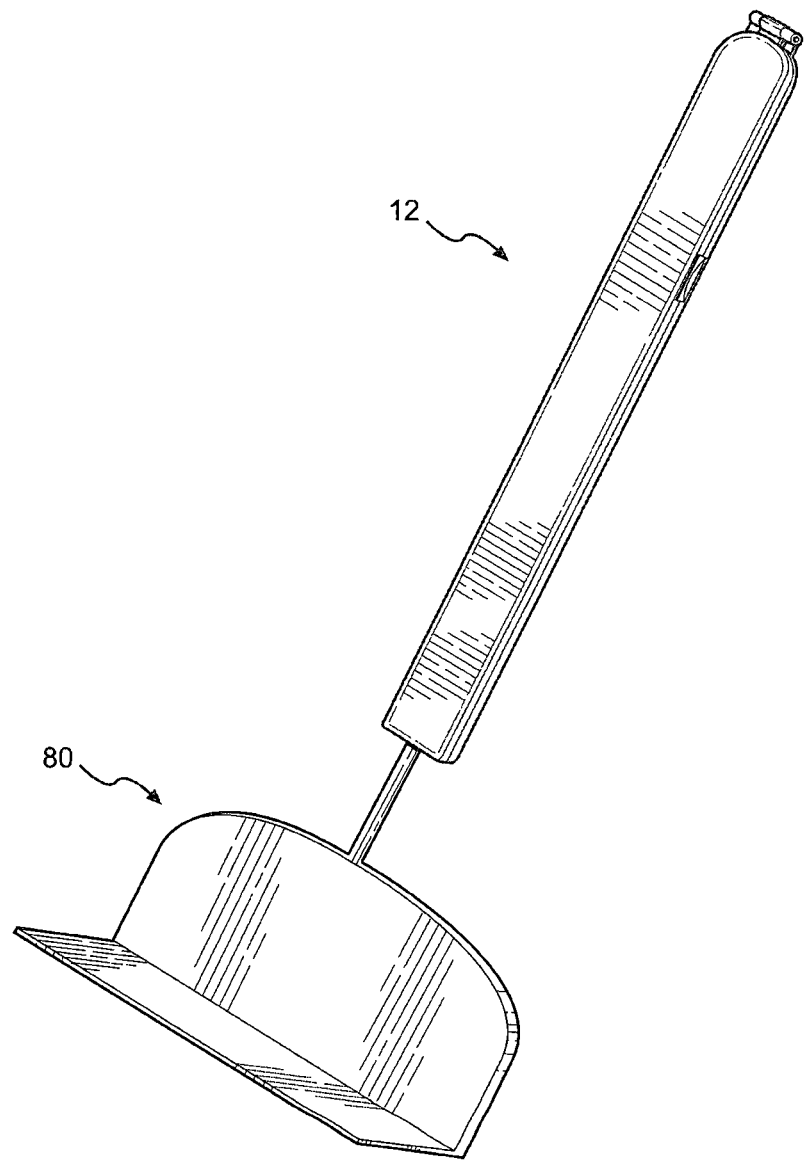
FIG. 15 is a perspective view of a barbecue ash stirrer with the handle.
Figure 16:
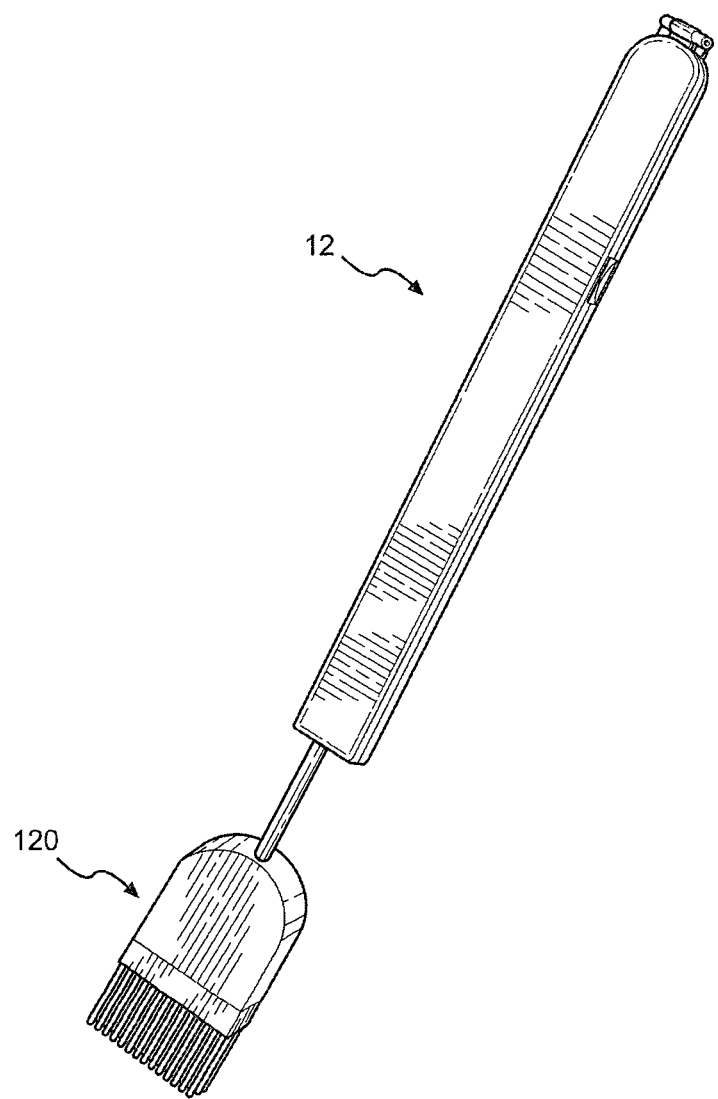
FIG. 16 is a perspective view of a barbecue sauce brush with the handle.

Using the handle is simple. One merely opens up the handle 12 by placing their thumb in the thumb indent and pushes to separate the rear side 14 of the handle 12 from the upper front side section 15. The upper front side section 15 is then magnetically attached to the metal shelf of a grill, such that the blade hangs downward. There is no need to look around to find a place to place the spatula where it won't fall on the ground. It is firmly attached to the metal shelf, where it is readily accessible. In one embodiment, the tool (in FIG. 12, the spatula) can be facing forward or backward. In another embodiment, the tool is positioned at the distal end of the handle.

This handle can be applied to other barbecue implements, including but not limited to a barbecue fork 70, an ash stirrer 80, a cleaning brush, and a barbecue sauce brush 120.

Similarly, in another embodiment, the handle can be used for paintbrushes, screwdrivers, hammers, and other tools.

It will be apparent to those skilled in the art that various modifications and variations can be made to the disclosure described above without departing from the spirit or scope of the disclosure. Thus, it is intended that the present disclosure cover modifications and variations that come within the scope of the appended claims and their equivalents.

I claim:

1. An implement comprising:
   a) a tool;
   b) a shaft having a proximal end and a distal end, said proximal end of the shaft being connected to a distal end of the tool;
   c) a handle, a proximal end of the handle connected to the distal end of the shaft, said handle comprising:
      i) a rear side, said rear side comprising an inside surface in the upper rear side, said inside surface comprising at least one ferromagnetic structure;
      ii) a front side, said front side comprising:
         A) a lower front side section; and
         B) an upper front side section having a proximal end and a distal end, the proximal end of the upper front side section being oppositely disposed relative to the distal end of the upper front side section, said upper front side section comprising an inside surface, said inside surface comprising at least one magnet positioned opposite said ferromagnetic structure, the upper front side section being rotatable between a closed position and an open position;
      iii) a flexing connector positioned at a distal end of said rear side and the distal end of said upper front side section such that said inside surface of said upper front side section folds against said inside surface of the upper rear side in the closed position, the upper front side section folding into a notched area of the handle when the upper front side section is moved to the closed position, the notched area of the handle being bounded on one side by said inside surface of the upper rear side; and
      wherein, in the closed position, the proximal end of the upper front side section is located closer to the proximal end of the shaft than in the open position; and
      wherein, in the open position, the inside surface of the upper front side section that comprises the at least one magnet is configured to be attached to a metallic support surface with the lower front side section being disposed opposite to the metallic support surface.

2. The implement of claim 1, wherein said tool is selected from the group of a barbecue spatula, barbecue forks, barbecue brushes, a barbecue ash stirrer, a cleaning brush, and a barbecue sauce brush.

3. The implement of claim 2, wherein said tool is a barbecue spatula.

4. The implement of claim 1, wherein the handle is made of a material selected from plastic, wood, resin, metal, or combinations thereof.

5. The implement of claim 1, wherein the handle has a rectangular shape.

6. The implement of claim 1, wherein the handle has a circular shape.

7. The implement of claim 1, wherein the handle has an oval shape.

8. The implement of claim 1, wherein the flexing connector is selected from a hinge, flexible plastic, and steel belted material.

9. The implement of claim 8, wherein the flexing connector is the hinge.

10. The implement of claim 9, further comprising knuckles of the hinge integral with and extending from both the distal end of the upper front side section of the handle and the distal end of the rear side, with a pin positioned through an opening formed by the knuckles.

11. The implement of claim 1, wherein:
    a) the at least one magnet of the inside surface of the upper front side section is in a form of at least one magnetic plate positioned on the surface of the inside surface of the upper front side section; and
    b) the at least one ferromagnetic structure of the inside surface of the upper rear side is in a form of at least one ferromagnetic plate positioned on the inside surface of the upper rear side, said at least one ferromagnetic plate positioned opposite said at least one magnetic plate.

12. The implement of claim 1, further comprising:
    a) at least one cutout positioned into the inside surface of the upper front side section;
    b) at least one magnet corresponding to each said at least one cutout into the inside surface of the upper front side section, each said at least one magnet fitted into each said at least one cutout;
    c) at least one cutout positioned into the inside surface of the upper rear side; and
    d) at least one ferromagnetic structure corresponding to each said at least one cutout into the inside surface of the upper rear side.

13. A handle for a tool comprising:
    a) a shaft having a proximal end and a distal end, said proximal end of the shaft being configured to be connected to a distal end of a tool;
    b) the handle, a proximal end of the handle connected to the distal end of the shaft, said handle comprising:
       i) a rear side, said rear side comprising an inside surface in the upper rear side, said inside surface comprising at least one ferromagnetic structure;
       ii) a front side, said front side comprising:
          A) a lower front side section; and
          B) an upper front side section having a proximal end and a distal end, the proximal end of the upper front side section being oppositely disposed relative to the distal end of the upper front side section, said upper front side section comprising an inside surface, said inside surface comprising at least one magnet positioned opposite said ferromagnetic structure, the upper front side section being rotatable between a closed position and an open position;
    c) a flexing connector positioned at a distal end of said rear side and the distal end of said upper front side section such that said inside surface of said upper front side section folds against said inside surface of the upper rear side in the closed position, the upper front side section folding into a notched area of the handle when the upper front side section is moved to the closed position, the notched area of the handle being bounded on one side by said inside surface of the upper rear side; and
    wherein, in the closed position, the proximal end of the upper front side section is located closer to the proximal end of the shaft than in the open position; and
    wherein, in the open position, the inside surface of the upper front side section that comprises the at least one magnet is configured to be attached to a metallic support surface with the lower front side section being disposed opposite to the metallic support surface.

14. The handle of claim 13, wherein said flexing connector is disposed at an outermost distal end of said handle.

15. An implement system comprising:
    a) a metallic support surface;
    b) a tool;

c) a shaft having a proximal end and a distal end, said proximal end of the shaft being connected to a distal end of the tool;
d) a handle, a proximal end of the handle connected to the distal end of the shaft, said handle comprising:
  i) a rear side, said rear side comprising an inside surface in the upper rear side, said inside surface comprising at least one ferromagnetic structure;
  ii) a front side, said front side comprising:
    A) a lower front side section; and
    B) an upper front side section having a proximal end and a distal end, the proximal end of the upper front side section being oppositely disposed relative to the distal end of the upper front side section, said upper front side section comprising an inside surface, said inside surface comprising at least one magnet positioned opposite said ferromagnetic structure, the upper front side section being rotatable between a closed position and an open position;
  iii) a flexing connector positioned at a distal end of said rear side and the distal end of said upper front side section such that said inside surface of said upper front side section folds against said inside surface of the upper rear side in the closed position, the upper front side section folding into a notched area of the handle when the upper front side section is moved to the closed position, the notched area of the handle being bounded on one side by said inside surface of the upper rear side; and
wherein, in the closed position, the proximal end of the upper front side section is located closer to the proximal end of the shaft than in the open position; and
wherein, in the open position, the inside surface of the upper front side section that comprises the at least one magnet is attached to the metallic support surface with the lower front side section being disposed opposite to the metallic support surface.

16. The implement system of claim 15, wherein, in the closed position, the upper front side section forms a generally flat surface with the lower front side section on the front side of the handle.

17. The implement system of claim 15, wherein, in the closed position, a length of the front side of the handle formed by the lower front side section and the upper front side section is equal to a length of the rear side of the handle.

18. The implement of claim 1, wherein, in the closed position, the upper front side section forms a generally flat surface with the lower front side section on the front side of the handle.

19. The implement of claim 1, wherein, in the closed position, a length of the front side of the handle formed by the lower front side section and the upper front side section is equal to a length of the rear side of the handle.

* * * * *